3,105,828
POLYMERIZING DIOLEFINS WITH ALKYL LITHIUM CATALYST IN TETRAHYDROFURAN SOLVENT

Lee M. Porter, Concord, Calif., assignor to Shell Oil Company, a corporation of Delaware
No Drawing. Filed Dec. 30, 1957, Ser. No. 705,783
8 Claims. (Cl. 260—83.7)

This invention relates to the polymerization of conjugated diolefins. More particularly, the invention relates to a new process for polymerizing conjugated diolefins to form polymers which are particularly valuable in the preparation of surface coatings.

Specifically, the invention provides a new and highly efficient process for polymerizing conjugated diolefins, such as butadiene, to form unsaturated polymers which may be used to form coatings for metal surfaces which have excellent resistance to hot solder and good flexibility. The process comprises contacting the conjugated diolefin with an organolithium compound in the presence of an ether solvent and in an inert atmosphere and substantially anhydrous conditions. The invention further provides coating compositions containing the polymers prepared by this method and metal surfaces coated therewith.

In order to permit the packaging of certain materials, such as soft drinks, in metal containers, it has been necessary to develop a coating for the inside lining of the can. Such a coating must be such that it imparts no taste or contamination of the food material and must have the necessary physical properties to withstand the steps involved in manufacture of the can, such as soldering operation, processing of the filled can and handling of the can after it has been sealed.

It has been proposed to use liquid polybutadienes, such as prepared by the use of sodium, for this application, but the results obtained have not been too satisfactory. The coatings prepared from these materials, for example, have poor resistance to hot solder (800° F.), limited flexibility and impact resistance and limited resistance to alkali and solvents.

It is an object of the invention, therefore, to provide a new process for preparing polymers of conjugated diolefins. It is a further object to provide a new process for preparing polymers of diolefins which possess superior properties as can coatings. It is a further object to provide a new process for preparing polymers of diolefins that give can coatings having excellent resistance to hot solder. It is a further object to provide a new process for preparing polymers of diolefins that give can coatings having good flexibility. It is a further object to provide a process for preparing polymers of diolefins that give can coatings having good resistance to alkali and solvents. It is a further object to provide new polymers of diolefins that have many new and unexpected properties. It is a further object to provide new polymers of diolefins that form superior can coatings. It is a further object to provide polymers that can be epoxidized to form new and valuable polyepoxide materials. These and other objects of the invention will be apparent from the following detailed description thereof.

It has now been discovered that these and other objects may be accomplished by the process of the invention which comprises contacting the conjugated diolefins, such as butadiene, with an organolithium compound, such as butyl lithium, in the presence of an ether solvent and in an inert atmosphere. It has been found that the liquid to solid polymers prepared by this method have surprising properties as can coating materials. Coatings prepared from these special polymers, for example, are inert to food materials and possess excellent resistance to hot solder, good flexibility and the necessary resistance to alkali and solvents. Evidence of the superior properties of the polymers over the conventional sodium polymerized butadienes is presented at the end of the specification.

The superior properties of the new polymers as noted above can be attributed in part to their unusual structure. The polymers prepared by this method have been found to have unusually high 1,2 content. Thus, the butadiene polymers prepared by the use of the alkyl lithiums have 1,2 contents of at least 90%, and preferably greater than 92% and have no more than 10% and preferably less than 8%, 1,4-structure. The polybutadienes prepared from sodium, for example, have only about 65%, 1,2 structure.

The conjugated diolefins used in the process of the invention are preferably the hydrocarbon conjugated diolefins having no greater than 8 carbon atoms, such as butadiene, isoprene, dimethyl butadiene, piperylene, methyl pentadiene and the like. Especially preferred are the conjugated diolefins containing from 4 to 6 carbon atoms. The diolefins used in the process of the invention should have a high degree of purity, e.g. they should have at least 90% purity and preferably more than 97% purity.

The organolithium compounds used in the process may be any organo-substituted lithium compound, and preferably a hydrocarbon lithium compound, such as, for example, alkyl, alkaryl, aryl or arylalkyl lithium compounds, such as ethyl lithium, butyl lithium, isopropyl lithium, n-dodecyl lithium, octadecyl lithium, allyl lithium, phenyl lithium, cyclohexyl lithium, octyl lithium and the like.

Compounds containing two or more lithium atoms may also be used, such as, for example, methylene dilithium, ethylene dilithium, pentamethylene dilithium, decamethylene dilithium, 1,4-dilithium benzene, dilithium naphthalene, 1,2,6-trilithium hexane, and the like.

Preferred catalysts comprise the straight chain alkyl and aryl lithium compounds containing from 3 to 30 carbon atoms and still more preferably from 3 to 15 carbon atoms.

The organolithium catalysts are prepared by conventional methods, such as by the addition of lithium metal dispersion to a hydrocarbyl chloride in a suitable solvent. This is exemplified by the following procedure showing the preparation of n-butyl lithium.

N-BUTYL LITHIUM CATALYST 2.2 moles of lithium metal dispersion was combined with 100 ml. of benzene in a reaction flask equipped with stirrer and reflux condenser. This flask was purged with nitrogen and the mixture stirred. 1 mole of n-butyl chloride was then added dropwise and the mixture kept at a temperature of 80° C. or less for several hours. The resulting product was a colorless liquid, easily separable from the purple solid by-products. It was placed under nitrogen until used as a catalyst as shown in the example below.

Dodecyl lithium catalyst is prepared in the same manner by replacing the butyl chloride with 1-chlorododecane. Phenyl lithium may be prepared in the above manner by replacing the butyl chloride with bromobenzene. Pentamethylene dilithium is prepared by replacing the butyl chloride in the above process with pentamethylene dichloride.

For the purpose of this invention, it will be understood that when reference is made to alkyl lithium catalysts, polymerized forms thereof are also included. This is because some of the alkyl lithiums are found to exist in forms other than the monomer.

The amount of the initial monomer and the amount of the organolithium compound to be used in the process will vary depending chiefly on the molecular weight desired for the initial polymer segment. Assuming that each of the organolithium molecules give rise to a ploymer macromolecule, and that the macromolecules under the conditions of the process can be initiated in no other way, then by controlling the amount of the monomer and the catalyst we can control molecular weight. On this basis, we can keep the amount of the monomer constant and get different molecular weights by changing the amount of the catalyst, or we can hold the amount of catalyst constant and get different molecular weights by varying the amount of monomer. For example, theoretically, to obtain a molecular weight of say 100,000 using .0027 mol of organolithium catalyst one would need approximately 4 mols of butadiene. To obtain the polymers having superior properties as can coatings the amount of catalyst should preferably vary from about .001 mol to .1 mol per mol of monomer.

The process of the invention can be used to produce polymers of any desired molecular weight. Preferred molecular weights range from about 2,000 to 500,000. Those polymers which are particularly useful for preparing surface coating compositions preferably have molecular weights between 2,000 to 100,000, while those that may be used for epoxidation reactions may have molecular weights lower or higher than this range. These values are determined by the light scattering technique as disclosed in Chem. Rev., vol. 40, page 319 (1949).

It is convenient sometimes to express the molecular weight in terms of intrinsic viscosity of the polymer and in some cases the molecular weights of the polymers shown herein may be defined by the intrinsic viscosity measured in deciliters per gram in toluene at 25° C. In considering the molecular weight ranges above, it has been found that those polymers of particular value in preparing coatings are those having intrinsic viscosities from about .1 to 2.

Another important consideration in obtaining the desired polymers is the use of an ether solvent. Particularly preferred are the aliphatic and cycloaliphatic ether solvents, such as tetrahydrofuran, dioxane, diethyl ether, diamyl ether and the like. Tetrahydrofuran is especially preferred.

The amount of the ether diluent used is also important, particularly with respect to the percent of the 1,2 structure found in the polymer. Increasing the amount of the ether diluent gives increased amount of the 1,2 structure in the polymer. For example, polybutadiene having 80% or better 1,2 structure is obtained when the amount of ether is greater than .4 mol per mol of butadiene.

As noted above, the process of the invention should be conducted in an inert atmosphere. This is preferably accomplished by sweeping out the reaction zone with an inert gas and maintaining an atmosphere of the inert gas during the course of the reaction. Suitable inert materials include nitrogen, methane, and the like.

The process should also be conducted under substantially anhydrous conditions. This is accomplished by using anhydrous reactants and dry reaction vessels and maintaining customary precautions during the reaction to keep moisture out of the reaction vessel.

Another important consideration in obtaining the desired products is the temperature at which the polymerization is conducted. In general, temperatures which range from −40° C. to about 100° C. may be employed. If the monomer is a diolefin, such as isoprene, the reaction generally proceeds well at room temperature and no heat need be applied. With other monomers, the preferred temperatures which range from about 0° C. to 60° C. are found to produce the highest yield of the desired polymer.

The process of the invention is advantageously conducted in a closed system wherein the loss of solvent or monomer by evaporation is reduced or avoided in addition to which air and moisture are excluded. As a convenient procedure, the pressure at which the reaction is conducted may be the pressure created by the system, i.e. autogenic pressure. If desired, however, higher or lower pressures may be employed.

A particularly preferred method of operation is to combine the solvent and catalyst, introduce the monomer into this mixture and then heat the combined mixture to the desired temperature. In the case of monomers, such as butadiene, it is preferred to bubble the dry monomer into the solvent-catalyst mixture over a period of time. The rate of addition is preferably such that the heat of reaction is dispersed without the application of external cooling means. External cooling means may be applied if desired, however, to speed the rate of addition. In this preferred method of operation, the time required for the reaction will depend upon the rate of addition of monomer as well as the reaction temperature. At the preferred temperature of 0° C. to 60° C., with the addition of butadiene over a period of time, the polymerization can conveniently be carried out in from about 30 minutes to about 4 hours.

At the completion of the reaction, the mixture is then treated with a proton donor to deactivate the lithium compound and the polymer recovered. This is preferably accomplished by coagulating the crude reaction mixture by addition to a large amount of alcohol or water and then recovering the polymer coagulate. This procedure not only deactivates but also removes the lithium compound from the polymer.

A less preferred procedure involves addition of the proton donor in smaller amounts, e.g. at least one mole per mol of the lithium compound, to the crude reaction mixture to deactivate the lithium compound and then using this mixture directly in the intended applications, such as in the preparation of surface coatings.

The process of the invention is suitable for batch, intermittent or continuous operations with the first being preferred. Continuous operations are difficult to control in conventional apparatus and successful continuous operations require the use of expensive apparatus which must be especially fabricated.

The process of the invention may be varied in some respects without departing from the scope of the invention. Thus, it is possible to replace part of the diolefin in the reaction mixture with other ethylenically unsaturated monomers to form copolymers. Materials that may be utilized in this capacity include, among others, styrene, alphamethylstyrene, vinylpyridine, 2-methyl-5-vinylpyridine, divinylbenzene, and the like. These materials are preferably used in minor amounts, e.g. up to 30% by weight of the monomer charge.

The process of the invention may also be varied by including other types of solvents in the reaction mixture, such as hydrocarbons as benzene, toluene, and the like. These materials, however, should not exceed over 25% of the total solvent.

The polymers obtained by the process of the invention will vary from liquid to solid polymers. The polymers will have a high percent of the diolefin units in a 1,2 structure, and preferably at least 80% of the diolefin units in the 1,2 structure. Their molecular weight will vary from about 2,000 to 500,000 as described hereinabove.

As noted above, the polymers having molecular weight ranging from 2,500 to 100,000 have been found to be particularly suited for use in preparing coating compositions. Such coatings may be colorless varnishes for coating of metal, wood and the like or as pigmented coatings and enamels. The polymers are particularly suited for use in coating metals, such as those used in making metal containers, as they have good adhesion to the metal and form coatings which have good resistance to hot solder and have good solvent and water resistance and good flexibility. In making coatings of this type, the polymer may be dissolved in a suitable solvent or may be used in the solvent employed in the preparation and the mixture applied to the metal by dipping, painting, rolling or any suitable means. The coated metal is then subjected to heat to effect cure. Temperatures used in these applications generally range from about 200° F. to about 500° F. Cure time ranges generally from about 10 minutes to about 30 minutes. The cure of the coating may be accomplished at lower temperatures and generally in thicker films by the addition of driers, such as cobalt driers in amounts generally ranging from about .01% to 2% by weight.

Baking enamels may be prepared from the new polymers by adding pigments, such as titanium dioxide, driers, and the like.

The polymers having the high 1,2 structure as produced by the process of the invention are also particularly valuable in the preparation of new polyepoxide material. In this application they may be treated with peroxidizing agents, such as peracids, to convert the vinyl groups on the polymer backbone chain to epoxy groups.

The epoxidation of the new 1,2-poly(diolefins) may be accomplished by reacting the unsaturated polymers with an epoxidizing agent such as organic peracids as performic, peracetic, perbenzoic and monoperphthalic acids and the like. Agents such as performic acid and peracetic acid are usually used in solutions of their carboxylic acids. Thus, performic acid may be used, for example, as a 10% to 50% solution of the performic acid in formic acid. These solutions are preferably obtained by adding less than an equivalent amount of hydrogen peroxide to the acid as formic acid. Solid peracids may be used with inert solvents as benzene, toluene, chloroform and the like.

The amount of the epoxidizing agent employed will vary over a considerable range depending upon the type of product desired. In general, one should employ at least one mole of the oxidizing agent, such as peracetic acid, for every ethylenic group to be epoxidized. In some cases, it is difficult to effect epoxidation of all of the ethylenic groups and if a completely epoxidized product is required, additional epoxidizing agent and/or longer reaction period may be required.

The temperature employed during the epoxidation may vary over a considerable range depending upon the type of reactants and epoxidizing agents selected. It is generally desirable to maintain the temperature between −20° C. to 100° C. Preferred temperatures range from about −10° C. to room temperature, e.g. about 20° C. Atmospheric, superatmospheric or subatmospheric pressures may be employed as desired.

The epoxidized product obtained by this method may be recovered from the reaction mixture by any convenient means known to the art, such as distillation, extraction, fractional precipitation and the like.

The epoxidized products prepared as above may be easily cured with amine curing agents to form hard insoluble infusible coatings.

In this application, the epoxidized product, amine curing agent and solvent are mixed and applied to the desired surface and allowed to set. Cure may be accelerated by application of heat. The resulting films are hard and insoluble and infusible.

The new polymers of the invention are also useful in the preparation of adhesives and may be cross-linked with peroxides to form solid plastic articles.

To illustrate the manner in which the invention may be carried out, the following examples are given. It is to be understood, however, that the examples are for the purpose of illustration, and the invention is not to be regarded as limited to any of the specific conditions cited therein.

The butadiene used in the examples was of 99% purity and carefully dried.

In all of the polymerization reactions reported below, the glass reactor was dried by gently flaming with an open flame, passing nitrogen through the reactor and cooling down with nitrogen still being passed through.

The 1,2 structure of the polymers shown in the examples was determined by infra-red analysis.

*Example I*

(A) This part of the example illustrates the preparation of a polymer of butadiene using butyl lithium and tetrahydrofuran and the use of the polymer as a can coating.

To a reaction vessel which was flushed with nitrogen to remove air was charged 415 parts of dry tetrahydrofuran and 4.16 parts of n-butyllithium in benzene solution. To this mixture was slowly added 100 parts of dry butadiene having a purity of 99%. After addition of butadiene started, the temperature was raised to about 50–60° C. and maintained in that range for about 2 hours. At this time, the contents of the reaction was a viscous liquid. More tetrahydrofuran was added to the reactor and then the resulting solution poured into methanol whereupon the mixture separates into two layers. The methanol layer is discarded leaving the polymer layer. The polymer is a thick viscous liquid at room temperature. Infrared analysis indicated the polymer had 92% 1,2 structure and 8% trans 1,4. The polymer had a molecular weight between 10,000 to 15,000.

The viscous polymer produced above is placed in paint mineral spirits to form a solution having solids content of about 40%. This solution was then spread as a film of about 0.15 to 0.2 mil thickness on tin plate and the plate baked for 15 minutes at 400° F. The resulting film had good adhesion, passed the 1.8 inch mandrel flexibility test, passed the double bend test, had an impact in.-lb. of greater than 62, was very hard, had good resistance to solder at 800° F., was not affected when placed in water at 250° F. for 6 hours and had good resistance solvents, 20% NaOH and 20% sulfuric acid.

0.01% cobalt was added to the solvent solution of the above polymer and this mixture applied on a 1 mil thick film to tin plate and baked at 400° F. for 15 minutes. The resulting film also possessed the above-noted superior properties.

(B) The coatings prepared from the polybutadiene shown above possessed particularly outstanding resistance to hot solder. In this test, hot solder at 800° F. is poured on the back of the coated panel. The appearance and condition of the film are then noted. In the case of the coatings prepared from the above-noted polybutadiene, the films were not discolored or affected in any noticeable way. In related experiments, however, where a commercial polybutadiene prepared from sodium catalyst as well as a commercial liquid polymer of butadiene (80%) and styrene (20%) were applied to tin panels as noted above and subjected to the hot solder test, the films were discolored badly and showed signs of integration.

(C) The above polymer could also be easily epoxidized with peracetic acid in chloroform to form a polyepoxide which can be cured with diethylene triamine.

*Example II*

This example illustrates the preparation of a polymer of butadiene using a different amount of butyl lithium and tetrahydrofuran and a different temperature.

250 parts of tetrahydrofuran was added to the dry reaction vessel noted in Example I. To this was added 0.16 part of butyl lithium in benzene solvent. About 30 parts of butadiene was then slowly added to the mixture. The temperature was maintained at 5° C. for about 80 minutes. At this time, the contents of the reactor was a viscous liquid. More tetrahydrofuran was added to the reactor and then the resulting solution poured into methanol. The resulting polymer is a soft solid at room temperature. Infrared analysis indicated the polymer had 93% 1,2 structure and 7% trans 1,4. The polymer had an intrinsic viscosity of 2.05 in toluene at 25° C.

The viscous polymer produced above is placed in paint spirits to form a coating solution as in Example I. This solution was then spread as a film of about 0.15 to 0.2 mil thickness on tin plate and the plate baked for 15 minutes at 400° F. The resulting film passed the 1.8 inch mandrel flexibility test, passed the double bend test, had an impact in.-lb. of greater than 62, was very hard, had good adhesion and good resistance to solder at 800° F., was not affected when placed in water at 250° F. for 6 hours and had good resistance against solvents, 20% NaOH and 20% sulfuric acid.

0.01% cobalt was added to the solvent solution of the above polymer and this mixture applied as a 1 mil thick film to tin plate and baked at 400° F. for 15 minutes. The resulting films also had the above-noted superior properties.

*Example III*

This example illustrates the use of amyl lithium as the catalyst for polymerization of butadiene in tetrahydrofuran.

120 parts of tetrahydrofuran were added to the dry reaction vessel noted in Example I. To this was added 0.67 part of amyl lithium in benzene. 75 parts of butadiene was then added to the mixture and the temperature was maintained at 35–40° C. for about 2 hours. At this time, the contents of the reaction was a viscous liquid. More tetrahydrofuran was added to the reactor and then the resulting solution poured into methanol. The resulting polymer is a thick liquid at room temperature. Infrared analysis indicated the polymer had 89% 1,2 structure, 5% cis-1,4, and 6% trans 1,4. The polymer had a molecular weight of about 10–15,000.

This polymer was dissolved in paint spirits to form a coating solution having a solids content of about 30%. This solution was applied to tin plate as in the preceding example. The resulting cured films had good adhesion, good flexibility and hardness, good resistance to hot solder and good resistance to solvents.

The above polymers could also be easily epoxidized with peracetic acid in chloroform to form a polyepoxide which can be cured with diethylene triamine.

*Example IV*

250 parts of diethyl ether was added to the reaction vessel noted above. To this mixture was added 1.83 parts of butyl lithium in benzene. 200 parts of dry butadiene was then added to the mixture over a period of about 3 hours. The temperature was maintained at 34° C. for about 3 hours. More diethyl ether was added to the mixture and the resulting solution poured into methanol. The resulting polymer is a thick liquid having a high 1,2 content as shown by infra-red analysis.

This polymer was also useful in preparing coatings for tin plate as shown in the preceding example.

*Example V*

About 10 parts of tetrahydrofuran was combined with .4 part of a .7 normal amyl lithium solution in benzene. To this mixture was slowly added a mixture of 4 parts of styrene and 1 part of butadiene. The temperature was kept at 26° C. for about 50 minutes. The resulting copolymer was precipitated in methanol as in Example I. The resulting solid copolymer was molded at 170° C. and pressure of 10,000 p.s.i. to form a hard tough molding.

*Example VI*

About 1 part of tetrahydrofuran was combined with .4 part of .7 normal amyl lithium in benzene. To this mixture was slowly added a mixture of 2 parts styrene and 2 parts isoprene. The temperature was kept at 0° C. The resulting solid polymer which had a high 3,4 content could be molded at 170° C. to form a hard casting.

*Example VII*

About .2 part of tetrahydrofuran was combined with .15 part of a .4 normal amyl lithium solution in benzene. To this mixture was slowly added 2 parts of highly purified isoprene. The mixture was kept at 0° C. for about 2 minutes. The resulting polymer was precipitated in methanol as in Example I. The resulting solid polymer had a 1,2+3,4 structure of 92% and could be molded to form a hard casting.

*Example VIII*

Examples I to IV are repeated with the exception that 10% of the butadiene is replaced with styrene. The resulting polymers are also valuable in the preparation of coatings for tin plate as in the preceding examples.

*Example IX*

Examples I to IV are also repeated with the exception that the solvent employed is dioxane. The resulting polymers in this case are also valuable in the preparation of coatings for tin plate.

*Example X*

Examples I to IV are also repeated with the exception that the catalyst employed is phenyl lithium and n-heptyl lithium. The resulting polymers are also valuable for preparing coatings for tin plate.

*Example XI*

Examples I to IV are also repeated with the exception that the monomer employed is a mixture of butadiene and isoprene. The resulting polymers are also valuable for preparing coatings for tin plate.

I claim as my invention:

1. A process for preparing unsaturated polymers suitable for use in coating compositions which comprises contacting an unsaturated monomer of the group consisting of butadiene, isoprene, mixtures of butadiene and isoprene, mixtures of butadiene and up to 30% by weight of styrene, mixtures of butadiene and up to 30% by weight of alpha-methylstyrene, mixtures of isoprene and up to 30% by weight of styrene, mixtures of isoprene and up to 30% by weight of alpha-methylstyrene with from 0.001 to 0.1 mol per mol of unsaturated monomer of an alkyl lithium containing no more than 8 carbon atoms in the presence of at least 0.4 mol of tetrahydrofuran solvent per mol of unsaturated monomer in an inert atmosphere under substantially anhydrous conditions at a temperature in the range from —40° C. to 100° C., adding sufficient unsaturated monomer during said contacting step to produce a polymer having a molecular weight in the range from 2,000 to 500,000 as determined by the light scattering method, whereby a polymer is produced which contains no more than about 10% of 1,4-structure.

2. A process according to claim 1 in which said temperature is in the range from 0° to 60° C.

3. A process as in claim 1 wherein the alkyl lithium is amyl lithium.

4. A process as in claim 1 wherein the alkyl lithium is butyl lithium.

5. A process as in claim 1 wherein the alkyl lithium is heptyl lithium.

6. A process for preparing unsaturated polymers suitable for use in coating compositions which comprises contacting butadiene-1,3 with from 0.001 to 0.1 mol per mol of butadiene of a n-alkyl lithium containing from 3 to 6 carbon atoms in the presence of at least 0.4 mol of tetrahydrofuran solvent per mol of butadiene in an inert atmosphere under substantially anhydrous conditions at a temperature in the range from —40°–100° C., adding sufficient butadiene during said contacting step to produce a polymer having a molecular weight in the range from 2,000 to 500,000 as determined by the light scattering method, whereby a polymer is produced which contains no more than about 10% of 1,4-structure.

7. A process according to claim 6 in which there is added to the reaction mixture no more than 30% by weight based on butadiene of styrene.

8. A process according to claim 6 in which said temperature is in the range from 0° to 60° C.

References Cited in the file of this patent

UNITED STATES PATENTS

| | | |
|---|---|---|
| 2,849,432 | Kibler | Aug. 28, 1958 |
| 3,050,513 | Zelinski et al. | Aug. 21, 1962 |

FOREIGN PATENTS

| | | |
|---|---|---|
| 340,008 | Great Britain | Dec. 19, 1930 |

OTHER REFERENCES

Talalay et al.; Synthetic Rubber From Alcohol, Interscience Publishers Inc., N. Y. (1945), pages 147–151.

Hsieh et al.: Jour. Polymer Science, vol. 26, No. 113, pages 240–242.

Whitby: Synthetic Rubber, John Wiley & Sons (N.Y.), 1954, page 755, Table 33.

Morita et al.: "Journal of American Chemical Society," vol. 79, November 20, 1957, pp. 5853–55.